US012763863B1

(12) United States Patent
Hollender

(10) Patent No.: US 12,763,863 B1
(45) Date of Patent: Oct. 13, 2026

(54) SYSTEM AND METHOD FOR DETERMINING PHASE AND DELAY OFFSETS OF COMBINED SOURCE CHANNELS

(71) Applicant: Keysight Technologies, Inc., Santa Rosa, CA (US)

(72) Inventor: Reinhold Frederick Hollender, Santa Rosa, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 58 days.

(21) Appl. No.: 19/040,021

(22) Filed: Jan. 29, 2025

(51) Int. Cl.
*H04B 17/364* (2015.01)
*H04L 1/00* (2006.01)

(52) U.S. Cl.
CPC ......... *H04B 17/364* (2015.01); *H04L 1/0078* (2013.01)

(58) Field of Classification Search
CPC ............................ H04B 17/364; H04L 1/0078
See application file for complete search history.

(56) References Cited

U.S. PATENT DOCUMENTS

| | | | | |
|---|---|---|---|---|
| 5,537,121 A * | 7/1996 | Lennen | G01S 19/32 | 342/357.75 |
| 2008/0153433 A1 * | 6/2008 | Pallonen | H03F 3/211 | 370/282 |

OTHER PUBLICATIONS

"Improving Phase Measurement Accuracy," https://helpfiles.keysight.com/csg/e5071c/measurement/optimizing_measurements/improving_phase_measurement_accuracy.htm, Dec. 26, 2024, pp. 1-9.
"Delve into Constructive and Destructive Intererence Fundamentals with Prof. Email Bjornson's Insightful Video Series," TMYTEK, Nov. 14, 2023, pp. 1-9.

* cited by examiner

*Primary Examiner* — Sung S Ahn

(57) ABSTRACT

A system and method include measuring differences in delay and phase offset between signals transmitted through different channels within a single common bandwidth, comprising steps of transmitting an identical signal through both separate channels at a same frequency; combining signals from two separate channels so that they constructively and destructively interfere at different frequencies; analyzing amplitude versus frequency characteristic of the combined signal such that when the signals are not matched in phase, delay and amplitude, a change in amplitude is determined across the common bandwidth as the combined signals constructively and destructively interfere at different frequencies; analyzing frequency content of the changing amplitude that represents rate of constructive and destructive interference; determining change in rate of constructive and destructive interference as amplitude changes between constructive interference and destructive interference; and identifying tones that have a best constructive and destructive interference representing a null outside the source or common bandwidth.

20 Claims, 5 Drawing Sheets

SYSTEM AND METHOD FOR DETERMINING PHASE AND DELAY OFFSETS OF COMBINED SOURCE CHANNELS

BACKGROUND

In modern communication systems, achieving extremely wide bandwidths often necessitates combining multiple signal sources (e.g., vector signal channels) to generate a larger signal bandwidth than is possible with a single channel. Consider a scenario where a communication system requires a signal bandwidth exceeding the capacity of a single vector signal generator (VSG). To meet this requirement, engineers can employ multiple VSGs, each generating a portion of the desired spectrum. 6G communication systems are prime examples where the required signal bandwidth exceeds the capacity of a single vector signal generator (VSG). By way of example, 6G aims to utilize higher frequency bands, including millimeter-wave (mmWave) and terahertz (THz) frequencies, to achieve ultra-high data rates and low latency. This necessitates extremely wide bandwidths, often in the range of tens of gigahertz. For instance, recent advancements have demonstrated data transmission rates of up to 100 gigabits per second using satellite-to-ground laser communications, indicating the substantial bandwidth requirements for 6G applications.

To generate and test such wideband signals, multiple synchronized VSGs can be employed, each covering a portion of the desired frequency spectrum. By aligning and combining the outputs of these generators, a composite signal with the necessary bandwidth for 6G system development and testing can be achieved. However, to ensure seamless integration of these multiple VSG signals into a composite signal, precise alignment in timing, phase, and amplitude is essential so that the combination accurately represents the desired bandwidth signal. Aligning these sources in terms of timing, phase, and amplitude is crucial to ensure they function as a single, cohesive wideband source. The individual source channels may also use different internal paths depending on output frequency, output bandwidth, or amplitude. These different internal paths will have varying contributions to the time, phase, and amplitude characteristics of the output signal that need to be compensated to maintain the correct output signal of the multi-channel source system.

Not only is it complex to compensate for time, phase, and amplitude characteristics in a multi-channel source system, but it can also be very costly and inefficient to generate and test such wideband signals with currently known signal analyzers. When multiple VSGs are employed to create a signal with a wider bandwidth than a single generator can produce, their outputs are combined to form a composite signal encompassing the total desired bandwidth. To accurately analyze and align these combined signals, the signal analyzer must be capable of capturing the entire bandwidth of the composite signal. The N9042B UXA Signal Analyzer, manufactured by Keysight Technologies, Inc., offers analysis bandwidth options up to 4 GHz, enabling it to capture and analyze wideband signals in one instantaneous capture. That is, the N9042B UXA Signal Analyzer is capable of capturing the entire combined bandwidth of all the Vector Signal Generator (VSG) sources in a single instantaneous bandwidth capture, or in other words, the full spectrum of the combined signals generated by multiple VSGs. Such a signal analyzer runs a full bandwidth, combined signal from the multi-channel source system, and estimates the delay and phase offsets by comparing the amplitude and phase response of the output signal versus the desired signal. The drawbacks of this method are that it requires a signal analyzer with the full bandwidth of the desired signal, and the individual source channels must be in the state needed to run the full bandwidth output signal (i.e., with offset center frequencies). Because the individual source channel states are constrained, this method is not suitable for determining the underlying delay and phase offsets between the channels as the paths in each channel change.

There is a need to determine delay (time) and phase differences between two different source channels after they have been combined without having to expensively capture and analyze wideband signals in one instantaneous capture or accounting for individual source channel states being constrained. There is also a need to determine delay (time) and phase differences between two different source channels after they have been combined while accounting for or compensating for the fact that different internal paths will have varying contributions to the time, phase, and amplitude characteristics of the combined output signal, so as to maintain the correct output signal of a multi-channel source system.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1A:
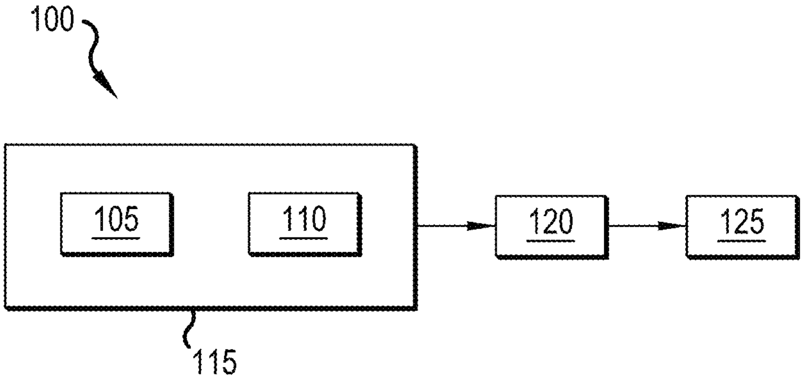
FIG. 1A is a block diagram of a system according to a representative embodiment.

Any of the information steps below can be performed by information stored in a computer-readable medium or data carrier system configured to carry out any of the steps described. The computer-readable medium or data carrier system can include a set of software instructions that can be executed to cause the device to perform any of the methods or processor-based functions disclosed herein.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising," and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

Figure 1B:
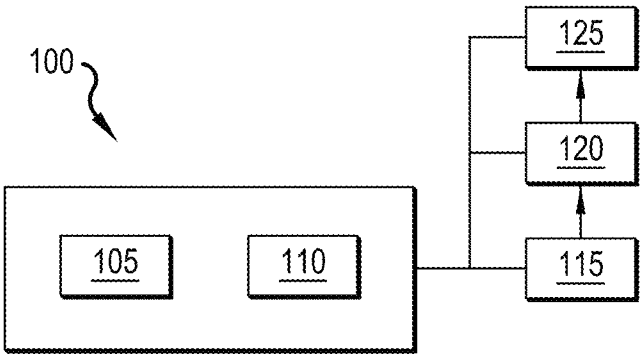
FIG. 1B is a block diagram of a system according to an alternative representative embodiment.

In an exemplary embodiment shown in FIG. 1A, a system 100 includes a signal generation module 115 comprising processor 105 and memory 110, a modulator 120, and a signal combiner 125. In an alternative embodiment shown in FIG. 1B, processor 105 and memory 110 are separate from signal generation module 115 (e.g., existing as a separate component or module). The system 100 is for example a signal processing apparatus, signal generator, or is part of a signal processing apparatus or signal generator. The memory 110 is for example a non-transitory computer readable medium that stores instructions which are executable by a processor (e.g., processor 105) to carry out functions described herein. The signal generation module 115 comprises for example multiple independent oscillators that generate or produce continuous wave signals or modulated signals with varying phase, frequency, and amplitude (e.g., vector signals or multi-tone signals) for transmission in separate source channels within a single common bandwidth. "Source channel" is used herein to describe a logical or independent signal path within a module, component, or device, and is not to be confused with a channel as a medium (e.g., a wired or wireless medium) through which a signal may be transmitted to a receiver. "Source" refers to the signal generation origin (i.e., the signal generation module 115), and "channel" denotes a logical or independent signal path in the signal generation module 115 with its own distinct characteristics (e.g., frequency, amplitude, phase). The signal generation function as a whole is equivalent to the transmitter in a source-channel communication system. The signal generation module 115 is capable of generating a wide range of signals for testing. By way of example, signal generation module 115 generates at least two different kinds of signals (e.g., continuous wave or multi-tone), each occupying a separate source channel. Such signals may be referred to hereinafter as "generated signals". The oscillators in the signal generation module 115 determine the basic waveform (typically sine, square, or modulated waves) and frequency for transmission through each source channel within a single common bandwidth. Alternately, the signal generation module 115 may comprise multiple frequency synthesizers for precise frequency generation and control. In either case, multiple signals can be generated that overlap in frequency or have the same frequency. The generated signals can be used directly or modulated. Where applicable (e.g., vector signal generation), modulator 120 modulates the generated signals with the desired modulation format (analog or digital) in preparation for combination of the signals by adjusting the phase, frequency, or amplitude of each signal so they can coexist constructively or destructively as intended.

Signal combiner 125 receives the at least two different signals and combines or merges the multiple generated signals from separate source channels within a single common bandwidth to create a more complex composite signal or waveform. In the present exemplary embodiment, at least two generated signals with overlapping or same frequency are combined by way of example; however, the exemplary methods and systems of the present disclosure can be applied to any number of generated signals from separate source channels. In combining the multiple generated signals, signal combiner 125 generates a composite signal that has frequency components of both generated signals. The signal combiner 125 combines or merges the signals from the multiple oscillators (or other signal generation sources) of the signal generation module 115 from separate source channels, such as combining two signals at the same frequency to create interference patterns (constructive or destructive) to facilitate interference analysis. This allows for the examination of constructive and destructive interference patterns for measuring differences in delay and phase offset between the separate source channels. For example, if there are two oscillators generating signals at 1 GHz and 1.1 GHz, a signal combiner 125 combines these two signals to produce a new signal that results in an output containing both frequencies, 1 GHz and 1.1 GHz, without generating new frequency components. Where the two oscillators generate signals at the same or overlapping frequency (e.g., 1 GHz), there is interference. When the source channels have the same or overlapping frequencies and are combined, the outcome is determined by the relative amplitude, phase, and delay of the signals. If the signals are in phase (their peaks and troughs align), the amplitudes of the two signals add together, which is an example of constructive interference. For example, two signals at 1 GHz with amplitudes $A_1$ and $A_2$ will combine to produce a new signal with an amplitude of $A_1+A_2$. If the signals are out of phase (e.g., one signal's peak aligns with the other's trough), they will partially or completely cancel each other out, depending on their relative amplitudes and phase difference. For example, $A_1=A_2$ and the signals are exactly 180° out of phase, the signals will cancel entirely, resulting in no output at that frequency, which is an example of destructive interference.

While traditional signal generators primarily generate continuous wave signals or simple modulated signals, VSGs allow for the generation of complex modulated signals with precise control over amplitude, phase, and frequency components. VSGs use vector modulation, meaning they generate signals that have both phase and amplitude modulation. VSGs can create signals with complex I/Q (In-phase and Quadrature) components, enabling the generation of sophisticated signal formats used in communication systems (e.g., 5G, Wi-Fi, radar). I/Q (In-phase and Quadrature) Modulation allows the VSG to generate signals with two independent signal paths—one for the in-phase (I) component and one for the quadrature (Q) component. This enables the generation of signals with varying phase and amplitude, making them capable of producing a wide range of complex, multi-tone, and modulated signals. In a VSG, multiple signal generation modules 115 (oscillators) are combined and modulated in a highly controlled manner. The VSG may in some cases combine the functions of oscillators and combiner but with the added benefit of being able to precisely control the phase and amplitude of each component of the signal. This allows for the creation of multi-tone signals; VSGs can generate multiple tones at the same frequency or across different frequencies, with precise control over their phase and amplitude. VSGs can generate modulated signals with complex modulation schemes, such as QAM, OFDM, or FMCW, and they allow for the simulation of real-world communication signals. The signal combiner 125 can be used for example for combining I/Q components to generate the desired modulation and combining multiple tones at different frequencies with precise control over their interference patterns (constructive/destructive interference).

In one exemplary embodiment, signal generation module 115 runs a sequence of continuous wave signals at the same frequencies that combine and interfere from combination through signal combiner 125, and differences in phase between each pair of combining tones result in amplitude changes in the combined signal. The amplitude characteristic of the combined signals can be analyzed to determine the delay and phase offset between source channels. Where the generated signals comprise continuous wave tones, the delay and phase parameters can be determined from the amplitude of the tones such that a tuned, narrow bandwidth receiver can be used for detecting the amplitude at each single frequency.

In another exemplary embodiment, signal generation module 115 runs multi-tone signals through at least two different source channels (e.g., by generating signals with at least two different oscillators or VSGs) at the same frequencies that combine and interfere from combination through signal combiner 125, and differences in phase between each pair of combining tones result in amplitude changes in the combined signal. The amplitude characteristic of the combined multi-tone can be analyzed to determine the delay and phase offset between source channels. Where the generated signals comprise multi-tone, the delay and phase parameters can be determined from the amplitude of the tones with a broadband receiver or a swept narrow band receiver by way of example. For example, a tunable narrowband receiver can be used to sweep across the multi-tone composite signal and measure the amplitude of each frequency in turn.

In another exemplary embodiment, processor 105 can be used as a signal processor to process or analyze the continuous wave or multi-tone signals from the at least two different source channels. Signals from the separate source channels are combined via signal combiner 125, and the resulting waveform (representing the composite signal derived from the at least two different source channels) is analyzed by processor 105 to measure amplitude variations caused by constructive and destructive interference, as previously described. The processor 105 uses algorithms (e.g., Fourier analysis) to measure the amplitude and phase of the combined signal, identify the frequency content of the amplitude modulation, and calculate delay and phase offsets based on the observed interference patterns, as previous described.

Figure 2A:
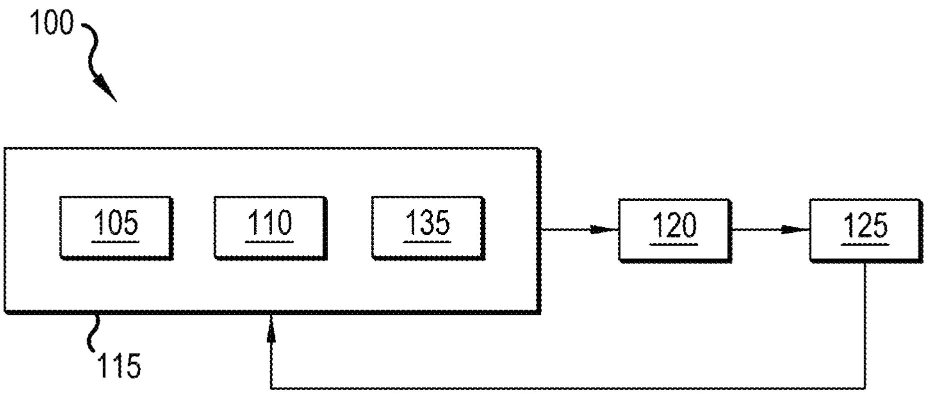
FIG. 2A is a block diagram of a system according to an alternative representative embodiment with an additional signal processor.
Figure 2B:
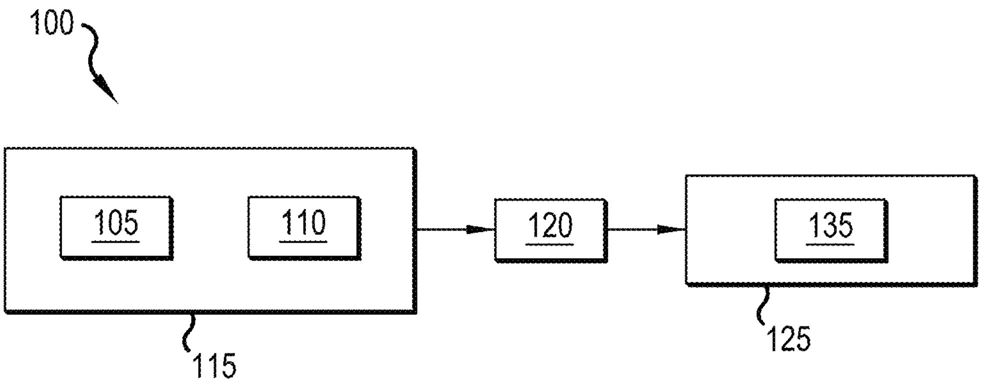
FIG. 2B is a block diagram of a system according to an alternative representative embodiment with an additional signal processor.

In an alternative embodiment shown in FIG. 2A, the signal generation module 115 comprises an additional signal processor 135 such as a digital signal processing unit (DSP) configured to analyze the multi-tone signals from the at least two different source channels. In another alternative embodiment, the additional signal processor 135 is one or more Field Programmable Gate Arrays (FPGAs) which is configured using software to perform any analysis function as a signal processor. Any one of the aforementioned embodiments can be used to perform real-time analysis of the multi-tone signals from the at least two source channels, including frequency domain analysis, to study interference patterns, frequency and amplitude characteristics, and the combined tones. In any embodiment where signal generation module 115 includes an additional signal processor 135 of some sort (DSP, FPGA, etc.) for subsequent signal analysis, the signal generation module 115 would require a combiner module (similar to signal combiner 125) or the signal would have to be sent downstream to the signal combiner 125 and return upstream to the signal generation module 115 for further signal analysis. Alternatively, as shown in FIG. 2B, signal combiner 125 can include a signal processor 135 such as a DSP, FPGA, ASIC, or similar to conduct further signal analysis.

Figure 3:
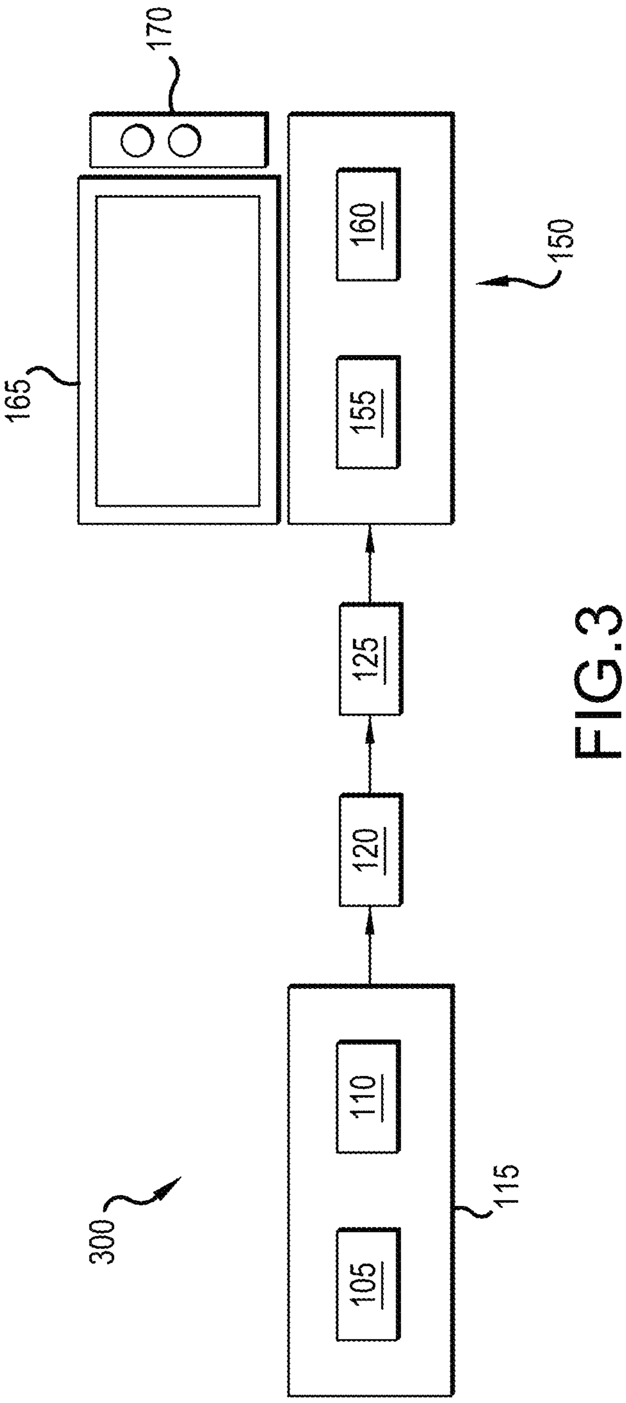
FIG. 3 is a block diagram of a system according to an alternative representative embodiment with an analyzer.

In another alternative embodiment shown in FIG. 3, a system 300 includes the system 100 and a spectrum analyzer 150, comprising for example a receiver 155, signal processor 160, display 165, and controls 170, wherein the receiver 155 receives the combined signal, the signal processor 160 is configured to display frequency content and other information on display 165, and signal processor 160 is further configured to measure the frequency content of the resulting waveform (representing the composite signal derived from the at least two different source channels) to measure amplitude variations caused by constructive and destructive interference, as previously described. The signal processor 160 uses algorithms (e.g., Fourier analysis) to measure the amplitude and phase of the combined signal, identify the frequency content of the amplitude modulation, and calculate delay and phase offsets based on the observed interference patterns, as previous described. For example, the spectrum analyzer 150 is used to display the amplitude of a signal as a function of frequency, helping to identify the individual frequency components within a signal, including any interference patterns. The composite signal to be analyzed (i.e. the composite signal of the multi-tone signals from each source channel) is input into the spectrum analyzer. The spectrum analyzer sweeps across a range of frequencies (from low to high) and measures the amplitude of each of the multi-tone signals from each source channel at each frequency. The results are shown on a screen, where the user can see the frequency content of the signal. In the present multi-tone signal case, the user visualizes separate peaks corresponding to each frequency component. In an alternative embodiment, an oscilloscope may be used to measure delay and phase offsets.

In one exemplary embodiment, system 100 is implemented in a signal generator such as the M9484C VXG, manufactured by Keysight Technologies, Inc. The M9484C VXG signal generator uses voltage-controlled oscillators (VCOs) as an example of a signal generation module 115 for generating signals. The M9484C VXG generates the core frequency (carrier wave) that can be modulated or used directly, covering a broad frequency range from 100 kHz to 50 GHz. These VCOs are controlled by a phase-locked loop (PLL) to ensure high stability and precision in generating the desired carrier frequency. The VCOs in the M9484C VXG are designed to minimize phase noise, which is critical for high-quality signal generation, especially for advanced communication standards like 5G, 6G, Wi-Fi 6/7, and radar applications. The VCOs provide the base carrier signal, which is then modulated with digital or analog waveforms generated by the M9484C VXG's arbitrary waveform generator (AWG). The modulation process combines the oscillator's carrier frequency with the desired signal characteristics (e.g., amplitude, phase, and frequency variations). The AWG generates signals with precise amplitude, phase, and frequency characteristics for each source channel. M9484C VXG has separate connections for each channel. A signal combiner 125 can be added to sum the individual source channel outputs of the M9484C VXG so that the signals from the separate source channels are combined, and the resultant amplitude vs. frequency characteristic can be observed to analyze interference patterns. Because the VXG is a signal generator (focused on the transmitter side), a separate receiver component (a spectrum analyzer, oscilloscope, or vector signal analyzer) demodulates the signal, extracting the encoded information so that the signals can be analyzed. Because the VXG is a signal generator (focused on the transmitter side), it is often used in conjunction with a spectrum analyzer or signal analyzer (e.g, Keysight spectrum analyzer (e.g., PXA, MXA, or UXA series) or a vector signal analyzer (e.g., VSA software) which support multi-tone spectrum analysis) to analyze the transmitted signals, namely that the resultant amplitude vs. frequency characteristic can be observed to analyze interference patterns. For example, Keysight's 89600 VSA software can be used to perform detailed demodulation and analysis of complex signals, including multi-tone signals generated by the M9484C VXG. The M9484C VXG can also be paired with a Keysight X-Series Signal Analyzers to evaluate the transmitted signal, such as observing the resultant amplitude vs. frequency characteristic to analyze interference patterns.

Figure 4:
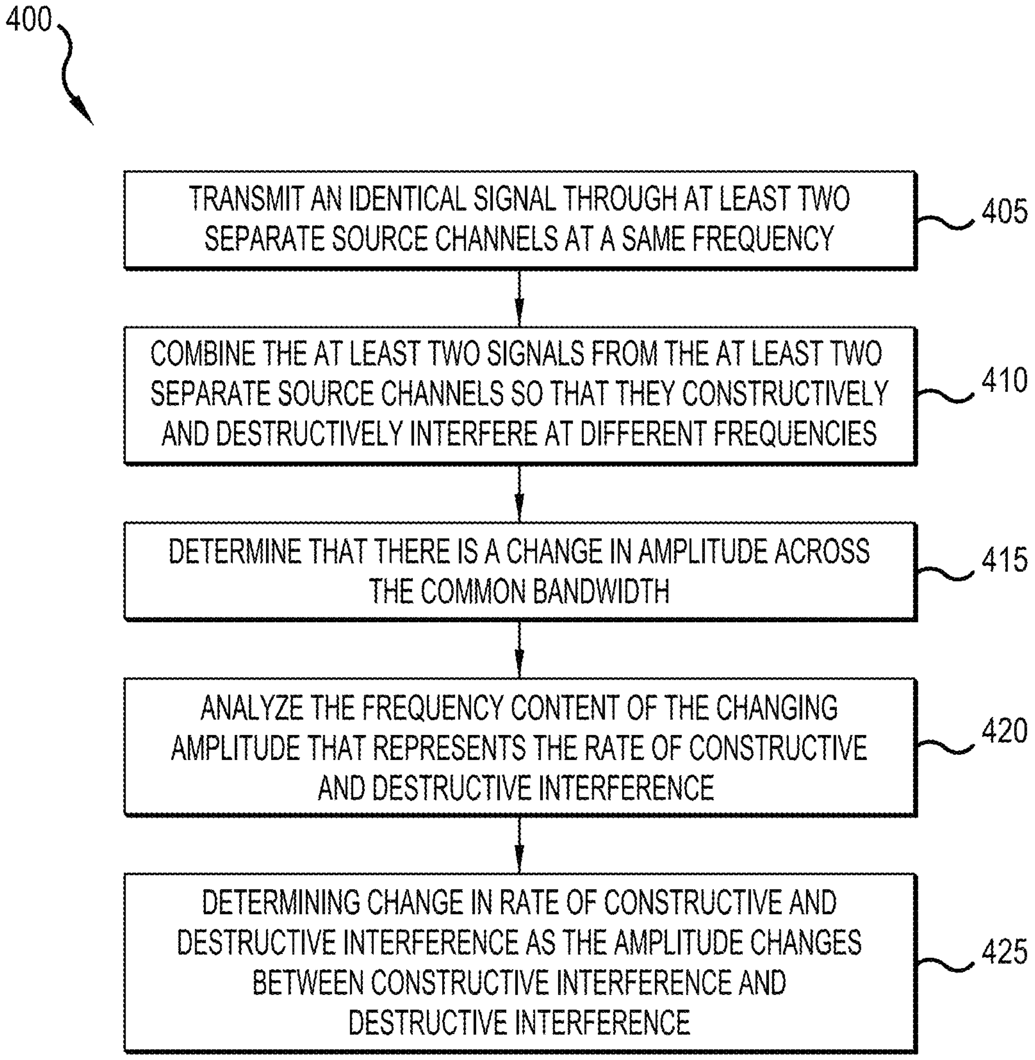
FIG. 4 is a flow diagram of a method for determining a coarse delay and offset according to a representative embodiment.

An exemplary embodiment of a method for measuring differences in delay and phase offset between signals transmitted through the at least two different source channels within a single common bandwidth begins with initially determining a coarse delay and offset estimate based on the steps shown in method 400 in FIG. 4. In step 405, a signal generation module 115 transmits an identical signal through at least two separate source channels at a same frequency. In step 410, a signal combiner 125 combines the at least two signals from the at least two separate source channels so that they constructively and destructively interfere at different frequencies. In step 415, a signal processor (e.g., processor 105, signal processor 135) analyzes amplitude versus frequency characteristic of the combined signal, and when the signals are not matched in phase, delay and amplitude, determines that there is a change in amplitude across the common bandwidth as the combined signals constructively and destructively interfere at different frequencies. In step 420, a signal processor (e.g., processor 105 or signal processor 135) analyzes the frequency content of the changing amplitude determined from step 415 that represents the rate of constructive and destructive interference. In step 425, a signal processor (e.g., processor 105, signal processor 135) determines change in rate of constructive and destructive interference as the amplitude changes between constructive interference and destructive interference to determine an initial estimated delay and phase offset between the source channels.

In mathematical terms, a coarse delay and phase offset estimate is made using the fact that a large delay between the source channels will generate a sinusoidal amplitude pattern, with the period of the sinusoid corresponding to the delay. The sum of two sinusoidal signals at the same frequency can be written as:

1.

$$s_{sum} = A_1 e^{i\theta_1} + A_2 e^{i\theta_2} = A_1(\cos\theta_1 + i*\sin\theta_1) + A_2(\cos\theta_2 + i*\sin\theta_2)$$

Where each signal is described a phasor with amplitude, A, and phase, θ. If the phasors are rotated such that the first signal has zero phase, the equation simplifies to:

2.

$$s_{sum} = A_1 + A_2[\cos(\theta_2) + i*\sin(\theta_2)]$$

The amplitude of the sum is then

3.

$$|s_{sum}| = \sqrt{(A_1 + A_2\cos\theta_2)^2 + A_2^2\sin^2\theta_2} = \sqrt{A_1^2 + 2A_1A_2\cos\theta_2 + A_2^2\cos^2\theta_2 + A_2^2\sin^2\theta_2}$$

4.

$$|s_{sum}| = \sqrt{A_1^2 + A_2^2 + 2A_1A_2\cos\theta_2}$$

If the signals are the same multi-tone signals with a fixed delay and phase offset, then the phase of the second signal can be written as

5.

$$\theta_2 = n(2\pi f_T \tau) + \theta, \text{ where}$$

a. n is the tone index, ie n=1 . . . M where M is the number of tones, b. $f_T$ is the frequency spacing between the tones, c. $\tau$ is the delay of the second channel relative to the first, and d. $\theta_0$ is the phase offset between channels Then, the amplitude spectrum of the combined multi-tone signals can be described as

6.

$$|s_{sum}| = \sqrt{A_1^2 + A_2^2 + 2A_1A_2\cos(2\pi n f_T \tau + \theta_0)}$$

If the result in equation 6 is squared, we end up with the following expression (7):

7.

$$|s_{sum}|^2 = A_1^2 + A_2^2 + 2A_1A_2\cos(2\pi n f_T \tau + \theta_0)$$

An analysis, based on Equation 7, can be used to determine that the amplitude versus frequency characteristic forms a sinusoidal pattern, with the sinusoid's frequency proportional to the delay offset and its phase corresponding to the phase offset The basic premise of this technique is to square the linear amplitude spectrum of the combined multi-tone signals, measure the frequency and phase of the squared amplitude spectrum, and use the measured frequency and phase to determine the delay and phase offset.

A standard Fourier transform over the tone amplitude squared spectrum will have a delay resolution that is equal to the inverse of the full signal bandwidth of the overlapped multi-tone signals. In practice, better resolution can be achieved by zero-padding the Fourier transform to decrease the bin size, and there are more advanced numerical techniques that may be able to provide better delay accuracy, but the efficacy is likely limited due to the limited information available. The author was able to achieve good results measuring 2×2.5 GHz BW source channels with a multi-tone signal consisting of 101 tones with 25 MHz spacing. The second source was offset by 10 ns, and the maximum delay spread was approximately +/−8 ns, keeping the full delay measurement between 2 ns and 18 ns, just inside the unique solution range of 0-20 ns for this waveform. The delay estimates used an FFT zero-padded to 128 times the original length, or 12928 points (where only the first 101 have the magnitude squared tone values). With these parameters, the FFT bin size (and delay resolution) is 1/(128*2.5e9)=3.125 ps, but the repeatability of the delay estimates tended to be in the +/−10-20 ps range.

Figure 5:
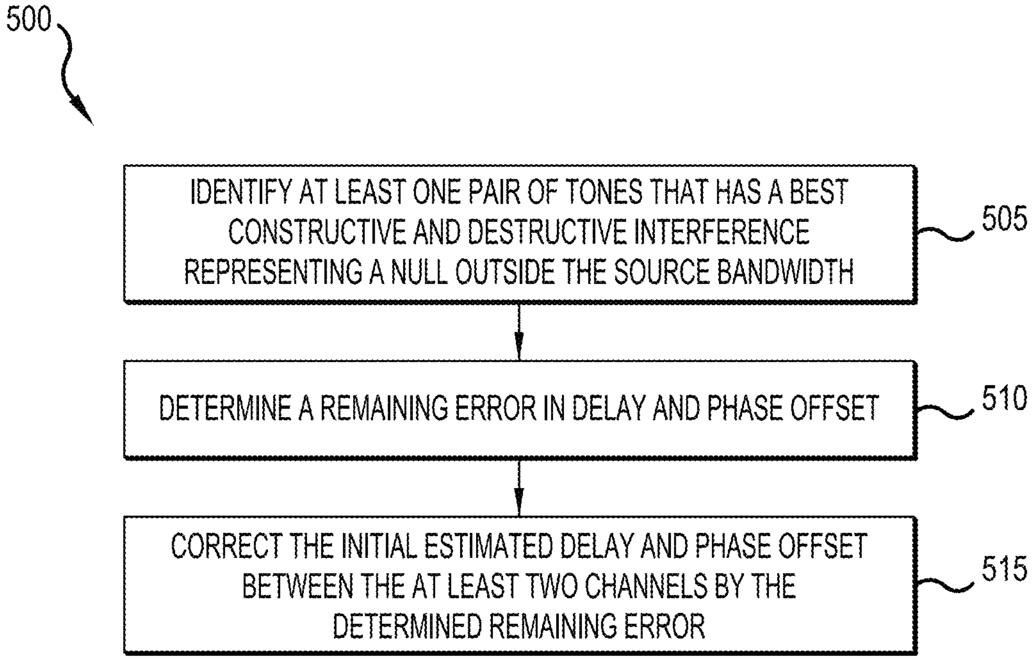
FIG. 5 is a flow diagram of a method for determining a fine delay and offset according to a representative embodiment.

After determining a coarse delay and offset estimate based on the steps shown in method 400 in FIG. 4, FIG. 5 shows an exemplary method 500 for fine delay and offset estimation. In step 505, a signal processor (e.g., processor 105, signal processor 135) identifies at least one pair of tones that has a best constructive and destructive interference representing a null outside the source or common bandwidth. In step 510, a signal processor determines a remaining error in delay and phase offset. Finally, in step 515, a signal processor corrects the initial estimated delay and phase offset between the at least two channels by the determined remaining error.

In mathematical terms, a fine delay and phase offset estimate is similar to a nulling technique, where the phase and delay of one source channel would be iteratively adjusted until the combined output signal has minimum amplitude across the full bandwidth. The issue with the nulling process is that it is iterative, and therefore slow. However, we can exploit the numerical properties of the combined signal amplitude equation as shown in equation 6 to make an estimate of the delay and phase near the null without needing iteration. If a 180 degree phase shift is added to one of the source channels, equation 6 changes to:

8.

$$|s_{sum}| = \sqrt{A_1^2 + A_2^2 + 2A_1A_2\cos(2\pi n f_T \tau + \theta_0 + 180)} = \sqrt{A_1^2 + A_2^2 - 2A_1A_2\cos(2\pi n f_T \tau + \theta_0)}$$

If we can assume perfect amplitude match, then this simplifies to

9.

$$|s_{sum}| = \sqrt{2A^2 - 2A^2\cos(2\pi n f_T \tau + \theta_0)} = A\sqrt{2 - 2\cos(2\pi n f_T \tau + \theta_0)}$$

The phase near the null is close to 0, so we apply the 2nd order small angle approximation for cosine (less than 1% error up to ~38 degrees):

10.

$$|s_{sum}| = A\sqrt{2 - 2\left[1 - \left(\frac{(2\pi n f_T \tau + \theta_0)^2}{2}\right)\right]} = A\sqrt{(2\pi n f_T \tau + \theta_0)^2} = A|2\pi n f_T \tau + \theta_0|$$

The amplitude term can be canceled using a measurement of the amplitude of a single source channel with no interference:

11.

$$\frac{|s_{sum}|}{|s_{ch1}|} = \frac{A|2\pi n f_T \tau + \theta_0|}{A} = |2\pi n f_T \tau + \theta_0|$$

The additional measurement of the amplitude of a single source channel is generally already present because the amplitudes of the at least two source channels must be equalized for the linear estimate to work, so this doesn't require additional time in practice. The final expression is nearly linear except for the absolute value, and the parameters can be found directly using non-linear techniques. However, using a small offset in both delay and phase can shift the zero crossing out of the measurement bandwidth, leaving a strictly linear characteristic with parameters that can be estimated using a simple linear regression. Offsets of 20 ps and 15 degrees were found experimentally to work well in the test system being used (2×VXG-C channel system, 2.5 GHz BW each). This does add 24 degrees of phase offset at the edge of the bandwidth, but this still leaves plenty of margin before the small angle formula begins to appreciable error.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive. One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Memory 110 may store instructions used to implement some, or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 110 is an article of manufacture and/or machine components. The memory 110 is a computer-readable medium from which data and executable software instructions can be read by a computer (e.g., the processor 105). Memory 110 may be implemented as one or more of random access memory (RAM), read only memory (ROM), registers, and register files, flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memory 110 may be volatile or non-volatile, secure and/or encrypted, unsecure and/or unencrypted. Memory 110 is any memory which is directly accessible to a processor. References to "computer memory" or "memory" should be interpreted as possibly being multiple memories. The memory may for instance be multiple memories within the same computer system. The memory may also be multiple memories distributed amongst multiple computer systems or computing devices.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method for measuring differences in delay and phase offset between signals transmitted through at least two separate channels within a single common bandwidth, the method comprising the processor-executed steps of:

transmitting an identical signal through the at least two separate channels at a same frequency combining the signals from the at least two separate channels so that they constructively and destructively interfere at different frequencies;

analyzing amplitude versus frequency characteristic of the combined signal, wherein when the signals are not matched in phase, delay and amplitude, determining that there is a change in amplitude across the common bandwidth as the combined signals constructively and destructively interfere at different frequencies;

analyzing frequency content of the changing amplitude that represents a rate of constructive and destructive interference;

determining change in rate of constructive and destructive interference as the amplitude changes between constructive interference and destructive interference to determine an initial estimated delay and phase offset between the at least two separate channels;

identifying at least one pair of tones that has a best constructive and destructive interference representing a null outside the bandwidth;

determining a remaining error in delay and phase offset; and correcting the initial estimated delay and phase offset between the at least two separate channels by the determined remaining error.

2. The method according to claim 1, wherein a Fourier transform is applied to extract the delay and phase offset from the amplitude versus frequency characteristic.

3. The method according to claim 1, wherein a Fourier transform applied over the signal amplitude squared spectrum will have a delay resolution that is equal to the inverse of the full signal bandwidth of the combined signals.

4. The method according to claim 1, further comprising zero-padding the Fourier transform to decrease bin size.

5. The method according to claim 1, wherein the initial estimated delay and phase offsets are further refined by applying a phase offset of 180 degrees to create destructive interference and further applying a small phase and delay offset to shift a null of the destructive interference outside of the bandwidth.

6. The method according to claim 5, wherein the amplitude characteristic is nearly linear and the step of determining a remaining error in delay and phase offset includes applying a linear fit.

7. A system for measuring differences in delay and phase offset between signals transmitted through at least two source channels within a single common bandwidth, comprising:
- a processor;
- a memory that stores instructions, which when executed by the processor, cause the processor to:
- transmit an identical signal through the at least two source channels at a same frequency;
- combine the signals from the at least two source channels so that they interfere;
- analyze amplitude versus frequency characteristic of the combined signal, wherein when the signals are not matched in phase, delay and amplitude, determine that there is a change in amplitude across the common bandwidth as the combined signals constructively and destructively interfere at different frequencies;
- analyze frequency content of the changing amplitude that represents the rate of constructive and destructive interference;
- determine change in rate of constructive and destructive interference as the amplitude changes between constructive interference and destructive interference to determine an initial estimated delay and phase offset between the at least two source channels;
- identify at least one pair of tones that has a best constructive and destructive interference representing a null outside the bandwidth;
- determine a remaining error in delay and phase offset; and
- correct the initial estimated delay and phase offset between the at least two source channels by the determined remaining error.

8. The system according to claim 7, wherein a Fourier transform is applied to extract the delay and phase offset from the amplitude versus frequency characteristic.

9. The system according to claim 7, wherein a Fourier transform applied over the signal amplitude squared spectrum will have a delay resolution that is equal to the inverse of the full signal bandwidth of the combined signals.

10. The system according to claim 7, further comprising zero-padding the Fourier transform to decrease bin size.

11. The system according to claim 7, wherein the initial estimated delay and phase offsets are further refined by applying a phase offset of 180 degrees to create destructive interference and further applying a small phase and delay offset to shift a null of the destructive interference outside of the bandwidth.

12. The system according to claim 11, wherein the amplitude characteristic is nearly linear and the step of determining a remaining error in delay and phase offset includes applying a linear fit.

13. A non-transitory computer readable medium that stores instructions for measuring differences in delay and phase offset between signals transmitted through at least two separate channels within a single common bandwidth, which when executed by the processor, cause the processor to:
- transmit an identical signal through the at least two separate channels at a same frequency;
- combine the signals from the at least two separate channels so that they constructively and destructively interfere at different frequencies;
- analyze amplitude versus frequency characteristic of the combined signal, wherein when the signals are not matched in phase, delay and amplitude, determine that there is a change in amplitude across the common bandwidth as the combined signals constructively and destructively interfere at different frequencies;
- analyze frequency content of the changing amplitude that represents a rate of constructive and destructive interference; and
- determine change in rate of constructive and destructive interference as the amplitude changes between constructive interference and destructive interference to determine an initial estimated delay and phase offset between the at least two separate channels.

14. The non-transitory computer readable medium according to claim 13, wherein a Fourier transform is applied to extract the delay and phase offset from the amplitude versus frequency characteristic.

15. The non-transitory computer readable medium according to claim 13, wherein a Fourier transform applied over the signal amplitude squared spectrum will have a delay resolution that is equal to the inverse of the full signal bandwidth of the combined signals.

16. The non-transitory computer readable medium according to claim 13, further comprising zero-padding the Fourier transform to decrease bin size.

17. The non-transitory computer readable medium according to claim 13, further comprising the instructions for causing a processor to:
- identify at least one pair of tones that has a best constructive and destructive interference representing a null outside the bandwidth;
- determine a remaining error in delay and phase offset; and
- correct the initial estimated delay and phase offset between the at least two separate channels by the determined remaining error.

18. The non-transitory computer readable medium according to claim 17, wherein the amplitude characteristic is nearly linear and the step of determining a remaining error in delay and phase offset includes applying a linear fit.

19. The non-transitory computer readable medium of claim 13, wherein the initial estimated delay and phase offsets are further refined by applying a phase offset of 180 degrees to create destructive interference, applying a small phase and delay offset to shift a null of the destructive interference outside of the bandwidth, determining a remaining error in delay and phase offset; and correcting the initial estimated delay and phase offset between the at least two separate channels by the determined remaining error.

20. The system according to claim 19, wherein the amplitude characteristic is nearly linear and the step of determining a remaining error in delay and phase offset includes applying a linear fit.

* * * * *